Oct. 21, 1969    L. MARTINAGLIA    3,473,474
SEALING MEANS FOR HIGH PRESSURE GEAR PUMP
Filed Nov. 1, 1967

INVENTOR.
LUIGI MARTINAGLIA
BY
McGlew & Toren
ATTORNEYS

United States Patent Office 3,473,474
Patented Oct. 21, 1969

3,473,474
SEALING MEANS FOR HIGH PRESSURE
GEAR PUMP
Luigi Martinaglia, Winterthur, Switzerland, assignor to
Maag Gear Wheel & Machine Company Limited,
Zurich, Switzerland
Filed Nov. 1, 1967, Ser. No. 679,812
Claims priority, application Germany, Dec. 23, 1966,
M 72,160
Int. Cl. F04c 1/02; F04b 21/08
U.S. Cl. 103—126                4 Claims

ABSTRACT OF THE DISCLOSURE

A high pressure gear pump of the type having movable lateral sealing surfaces on each side of the gears, and pressed into sealing relation by hydraulic pressure, has the sealing surfaces constituted by lamellar flexible sealing bodies or plates subjected to the high output pressure of the pump. In the areas requiring the most effective sealing, these lamellar flexible plates are formed with recesses in their exterior surface communicating with the high pressure chamber of the pump, and bearing plates engaging the outer surfaces of the lamellar flexible sealing plates may have their inner surfaces formed with recesses congruent to those in the lamellar flexible sealing plates.

BACKGROUND OF THE INVENTION

In known gear pumps of the type to which the present invention is directed, axially shiftable flanged bushings or bushes are built into the gear housing parts. These housing parts serve for journalling the shafts carrying the gears, mounting the bushes or bushings and mounting the pressure-loaded flanges for sealing the lateral surfaces of the gears. These flanged bushes, however, must be machined extremely accurately, and their movement is subjected to strong frictional forces. Consequently, it is substantially impossible to assure a contact or sealing pressure therethrough which is proportional to the hydraulic pressure.

SUMMARY OF THE INVENTION

This invention relates to high pressure gear pumps and, more particularly, to a novel sealing means for the gears of such pumps.

In accordance with the invention, the disadvantages of the prior art are eliminated by providing two lateral sealing surfaces, one on either side of the gears, in the form of lamellar flexible sealing bodies or plates which, under the influence of hydraulic pressure, conform closely against the surfaces to be sealed. Thereby, not only is a better seal obtained but also the construction of the pump is considerably simpler and less expensive. These lamellar flexible sealing plates and/or bearing plates in engagement with their outer surfaces may be formed with recesses adjacent those portions of the gears subjected to the highest pressure, and these recesses are connected to the high pressure chamber of the pump.

Accordingly, an object of the present invention is to provide improved lateral sealing means for a high pressure gear pump.

Another object of the invention is to provide such sealing means in the form of lamellar flexible sealing bodies pressed by hydraulic pressure against the surfaces to be sealed.

A further object of this invention is to provide a high pressure gear pump with more effective lateral sealing.

Still another object of the invention is to provide a high pressure gear pump in which lateral sealing is effected in a simpler and less expensive manner than hitherto possible.

A further object of the invention is to provide a high pressure gear pump with improved lateral sealing means including lamellar flexible sealing bodies having recess means on their outer surfaces connected to the high pressure chamber of the pump to pressure the sealing bodies into firm sealing engagement with the lateral surfaces of the pump gears.

BRIEF DESCRIPTION OF THE DRAWINGS

For an understanding of the principles of the invention, reference is made to the following description of a typical embodiment thereof as illustrated in the accompanying drawings.

In the drawings.

DESCRIPTION OF THE PREFERRED EMBODIMENT

Figure 1:
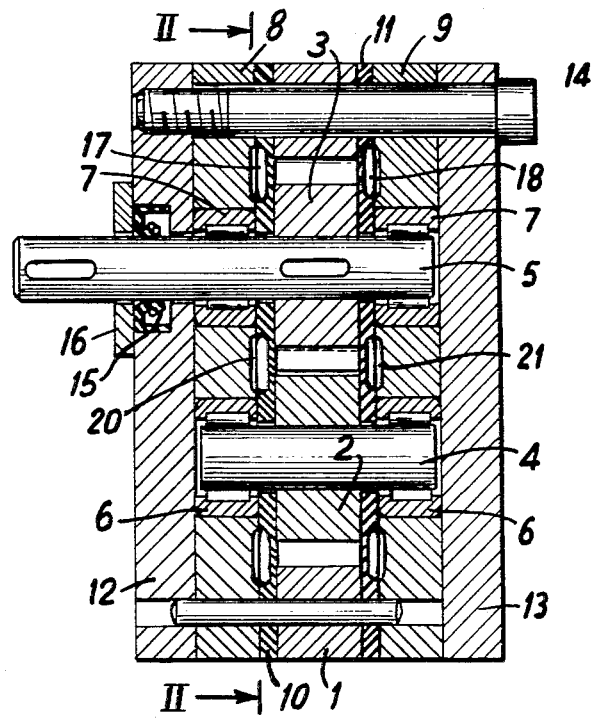
FIG. 1 is an axial sectional view through the two gear axes of a high pressure gear pump embodying the invention.

Referring to the drawings, the high pressure gear pump illustrated therein includes a substantially cylindrical casing 1 embracing two pumping gears 2 and 3 on respective shafts 4 and 5, the gear 3 being keyed or otherwise fixed to rotate with the shaft 5 constituting a drive shaft for the pump. Shafts 4 and 5 are mounted in respective needle bearings 6, 6 and 7, 7 having outer sleeves or races supported in bearing plates 8 and 9 of the pump.

Figure 2:
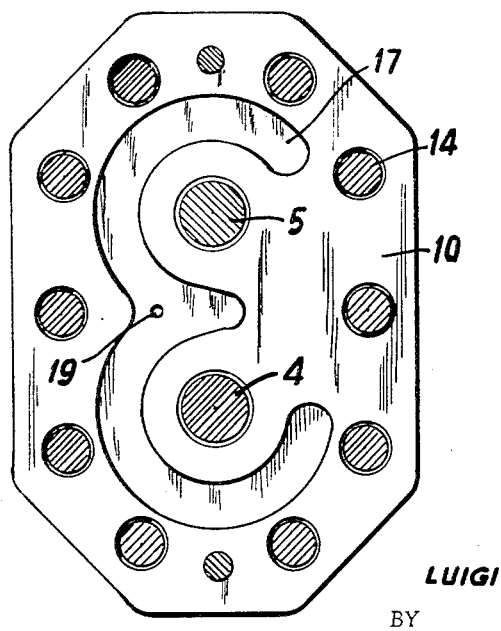
FIG. 2 is a sectional view on the line II—II of FIG. 1, and further constituting a side elevation view of a lamellar sealing body or plate.

In accordance with the invention, lamellar flexible sealing bodies 10 and 11 are disposed between case or casing 1 and the respective bearing plates 8 and 9. End covers 12 and 13 enclose the bearing plates 8 and 9 and are interconnected by screws, bolts or the like 14 to hold the entire pump unit together and seal it off from the exterior, with only driving shaft 5 protruding from the pump. Shaft 5 is sealed against the exterior by means of a seal 15 and a seal cover 16. Opposite those areas of the toothed peripheries of gears 2 and 3 where a high pressure prevails in the inter-teeth spaces, recesses 20 and 21 are formed in bearing plates 8 and 9. These recesses are hydraulically connected, through bore or passage 19 shown in FIG. 2, with the high pressure chamber of the pump. Thus, the pressure prevailing in recesses 20 and 21, and correspondingly the sealing pressure on the outer surfaces of lamellar bodies 10 and 11, is directly dependent, in these areas, on the pump output pressure. In order better to illustrate the novel feature of the invention, lamellar bodies 10 and 11 have been shown with an exaggerated thickness in the drawings, particularly in FIG. 1. Actually, these lamellar bodies are thin bodies, thus increasing their flexibility.

Those areas along the toothed peripheries of gear wheels 2 and 3 which are especially sensitive must be particularly well sealed off, and this is effected by means of recesses 17 and 18 in the outer surfaces of the thin lamellar sealing bodies or plates 10 and 11, respectively. Recess 17 is illustrated more particularly in FIG. 2, and it should be noted that the configuration of recesses 17 and 18 follows the configuration of recesses 20 and 21. By means of the recesses 17 and 18 in the already thin lamellar sealing bodies or plates 10 and 11, the recessed areas are even more flexible than the remainder of the sealing bodies or plates 10 and 11, which are already flexible. The remaining wall thickness in the zones of recesses 17 and 18, with its increased flexibility, acts like a membrane. If necessary or desirable, the recesses 20 and 21 in the respective bearing plates 8 and 9 can be omitted.

Due to the fact that recesses 17, 18 and 20, 21 are hydraulically connected with the high pressure chamber of the pump through bore or opening 19, the lamellar sealing bodies or plates 10 and 11, particularly in those areas wherein it is especially important that the interteeth spaces of the gears 2 and 3 be sealed off laterally, as by the sealing bodies or plates 10 and 11 lying laterally against the gears, these sealing bodies are always acted upon with a pressure proportional to the prevailing output pressure of the pump, so that a secure seal is assured. The sealing bodies or plates 10 and 11 are preferably thin plates of metal, for example, steel or steel-bronze.

In addition to a very compact design, which can scarcely be attained under equal conditions by prior art constructions, the invention sealing arrangement for a high pressure gear pump has the advantage of the greatest simplicity and reliability, and furthermore requires no maintenance.

What is claimed is:

1. In a high pressure gear pump of the type including intermeshing gears having their opposite lateral surfaces sealed by flexible sealing plates and including means forming chambers at the outer surfaces of said plates and subjected to fluid pressure, the improvement in which said chambers are formed, at least in part, by recesses in the outer surfaces of said flexible sealing plates at the regions to be sealed, the plate portions having said recesses therein having increased flexibility relative to the remainder of said sealing plates.

2. In a high pressure gear pump, the improvement claimed in claim 1, in which said recesses provide corresponding thinned areas of said sealing plates increasing the flexibility of said sealing plates in the areas of said recesses.

3. In a high pressure gear pump, the improvement claimed in claim 1, in which said chambers are completed by recesses formed in the inner surfaces of bearing plates engaging the outer surfaces of said sealing plates, the recesses in the inner surfaces of said bearing plates being co-extensive with the recesses in the outer surfaces of said sealing plates.

4. In a high pressure gear pump, the improvement claimed in claim 3, in which said chambers extend along those areas of the toothed peripheries of the gears subjected to high pressure.

References Cited

UNITED STATES PATENTS

| | | |
|---|---|---|
| 164,147 | 6/1875 | Conver. |
| 2,702,509 | 2/1955 | Garnier. |
| 2,809,592 | 10/1957 | Miller et al. |
| 3,096,719 | 7/1963 | McAlvay. |
| 3,348,492 | 10/1967 | Olson et al. |
| 3,371,615 | 3/1968 | Pettyjohn et al. |

DONLEY J. STOCKING, Primary Examiner

WILBUR J. GOODLIN, Assistant Examiner

U.S. Cl. X.R.

103—216